US 9,244,716 B2

(12) United States Patent
Freundlich et al.

(10) Patent No.: US 9,244,716 B2
(45) Date of Patent: Jan. 26, 2016

(54) GENERATION OF OPEN VIRTUALIZATION FRAMEWORK PACKAGE FOR SOLUTION INSTALLATIONS AND UPGRADES

(75) Inventors: Glen George Freundlich, Broomfield, CO (US); Prasad Subramanian, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 818 days.

(21) Appl. No.: 12/834,690

(22) Filed: Jul. 12, 2010

(65) Prior Publication Data

US 2011/0107330 A1  May 5, 2011

Related U.S. Application Data

(60) Provisional application No. 61/256,818, filed on Oct. 30, 2009.

(51) Int. Cl.
*G06F 9/46* (2006.01)
*G06F 9/455* (2006.01)

(52) U.S. Cl.
CPC .............. *G06F 9/45558* (2013.01); *G06F 9/46* (2013.01); *G06F 2009/45562* (2013.01)

(58) Field of Classification Search
CPC ......................................................... G06F 9/46

USPC .............................................. 705/7.18; 718/1
See application file for complete search history.

(56) References Cited

U.S. PATENT DOCUMENTS

| 6,199,178 | B1 | 3/2001 | Schneider et al. | |
| 6,735,601 | B1 | 5/2004 | Subrahmanyam | |
| 2007/0294676 | A1* | 12/2007 | Mellor et al. | 717/139 |
| 2008/0010496 | A1 | 1/2008 | Das et al. | |
| 2010/0169948 | A1* | 7/2010 | Budko et al. | 726/1 |
| 2010/0306772 | A1* | 12/2010 | Arnold et al. | 718/1 |
| 2011/0016468 | A1* | 1/2011 | Singh | 718/1 |
| 2011/0022695 | A1* | 1/2011 | Dalal et al. | 709/222 |

OTHER PUBLICATIONS

Jeff Gee, Project Kensho OVF tool advanced capabilities, Sep. 15, 2009, Citrix.*

* cited by examiner

*Primary Examiner* — Christine Behncke
*Assistant Examiner* — Kurtis Gills
(74) *Attorney, Agent, or Firm* — Sheridan Ross P.C.

(57) ABSTRACT

Methods, devices, and systems for creating a virtual machine are provided. In particular, a mechanism is provided which allows the automated creation of a virtual machine based on attributes of an existing physical machine. This allows for an efficient and user-friendly way of transitioning a physical machine or set of machines to a virtual machine architecture.

19 Claims, 5 Drawing Sheets

GENERATION OF OPEN VIRTUALIZATION FRAMEWORK PACKAGE FOR SOLUTION INSTALLATIONS AND UPGRADES

CROSS-REFERENCE TO RELATED APPLICATIONS

This application claims the benefit of U.S. Provisional Patent Application Ser. No. 61/256,818, filed Oct. 30, 2009, the entire disclosure of which is hereby incorporated herein by reference.

FIELD OF THE DISCLOSURE

The disclosure relates generally to virtual machines and mechanisms for creating the same.

BACKGROUND

Many virtualized platforms use the Open Virtualization Format (OVF) specification, created by the Distributed Management Task Force (DMTF) to control installation of a template. A template is a collection of virtual machine images and a descriptor (an OVF file) that specifies, in machine code, how to create virtual machines. The creation of OVF files has traditionally been a manual process requiring a user to interface with the OVF creator, which has been traditionally deployed as an application operating on a general-purpose computing device. Unfortunately, the manual process requires detailed knowledge of OVF and is error-prone. Particularly, a system administrator having specialized knowledge of both the OVF and the physical systems which are being migrated to virtual machines is required. Even a system administrator with the requisite knowledge to manually create an OVF file may still accidentally enter an incorrect value, resulting in the creation of a potentially flawed virtual machine.

Some solutions have been developed to address this issue. For example, Citrix provides a solution named "Kensho OVF Tool" which is essentially a graphical wizard which guides a user through the OVF-creation process. While this solution does provide a step toward automation of the OVF-creation process, a significant amount of user involvement is still required, thereby exposing the process to user error.

What is needed is a completely automated system for creating virtual machines and transitioning physical machines into virtual representations thereof.

SUMMARY

It is, therefore, one aspect of the present disclosure to provide a tool which completely automates the OVF-creation process.

It is another aspect of the present disclosure to automate a process by which one or more physical machines are transitioned to one or more virtual machines, which may or may not reside on a common physical machine.

In some embodiments, an automated OVF-creation process can be used to generate a template that includes instructions for installing a number of different virtual machines, each of which may correspond to a different application. As a non-limiting example, the various type of applications which may be installed into their own virtual machines via the execution of a template includes a communication server, an application enablement server, a Session Initiation Protocol (SIP) server, a utility server for providing Internet Protocol (IP) telephone firmware, a media server, a voicemail server, and other types of applications, devices, or servers, which may or may not be communications-related.

In some embodiments, a new way of generating a template for use during template installations and upgrades is provided. For instance, an operating system operating on top of a hypervisor can access a plurality of virtual machines via the hypervisor. The hypervisor contains information for each of the virtual machines including their location, space needs, application information, and other metadata.

An OVF-creator module is provided that is capable of taking a snapshot of a system with running virtual machines. This is typically the mode in which template writers (i.e., product houses) would operate, by manually creating virtual machines, populating those virtual machines with application images and data, allocating resources to the virtual machines (memory, disk, CPU, network resources), and then tuning the system so that the applications run with the desired performance. The present description employs an automated template writer in combination with an inspector that is capable of determining existing solution information, correlating virtual machines with application images and data, allocating resources to the virtual machines, and tuning the machines to operate according to predefined operational criteria. When the automated template writer believes the system is ready to copy, the automated template writer invokes the OVF-creator module.

The OVF-creator module would then examine the system to determine the existing virtual machines, images that populate the virtual machines, and resources for each virtual machine, and generate a file compliant with the OVF specification. The OVF file is an XML file that describes the applications, virtual machines, locations, hard disk needs, CPU needs, and memory needs for the template installation or upgrade. Along with the OVF file, the OVF-creator module also generates the elements (such as virtual machine images) that constitute a template.

This template is transmitted over a network interface to the customer (or delivered as a physical DVD) where it can be used for the installation process. Specifically, the customer side may have a template installer that can receive and process the template to complete an upgrade from their physical machine(s) to a corresponding virtual machine implementation of the same general construction.

In accordance with at least some embodiments of the present disclosure a method is provided that generally comprises:

receiving, at a template creator, information describing an existing solution having one or more physical machines with attributes associated therewith, the attributes of each physical machine describing one or more of processing capabilities, memory capabilities, and communication capabilities of the physical machine;

scanning the information describing the existing solution with an automated template writer to determine virtual machine attributes representing the physical machine attributes; creating, by the template writer, one or more virtual machine images having the virtual machine attributes;

determining, by the template writer, that the creation of the one or more virtual machine images is complete; and based on the template writer determining that the creation of the one or more virtual machine images is complete, the template writer invoking an OVF-creator to analyze the one or more virtual machine images and generate an OVF file containing instructions, in machine code, on how to create the virtual machine images.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to create virtual machines or transition physical machines into virtual machines.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
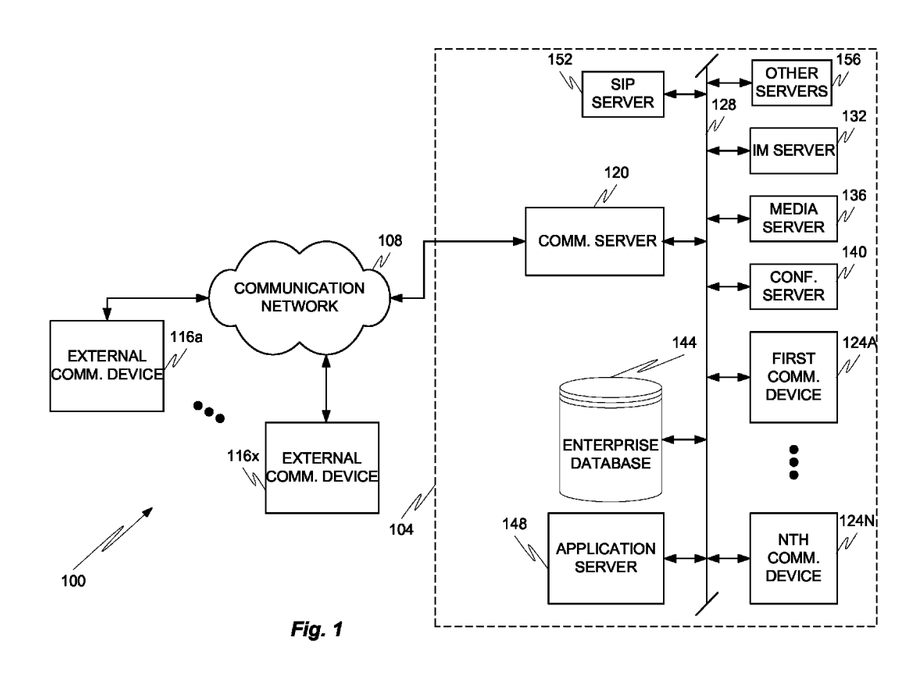
FIG. 1 is block diagram depicting a communication system having separate physical machines.

FIG. 1 depicts a communication system 100 having multiple physical machines within an enterprise network 104. The enterprise network 104 is in communication, via a (typically untrusted or unsecured or public) communication network 108, with a presence service 112, and a plurality of external communication devices 116a-x.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a communications server 120, an instant message server 132, an media server 136, a (web) conference server 140, a SIP server 152, other servers 156, an enterprise database 144, an application server 148, and a plurality of internal first, second, . . . nth communications devices 124a-n, interconnected by a (trusted or secure or private) Local Area Network (LAN) 128. The LAN 128 can be secured from intrusion by untrusted parties by a gateway (not shown) and/or firewall (not shown) located between the LAN 128 and communication network 108.

As will be appreciated, the internal communication devices 124a-N may be associated with one or more enterprise users. In some embodiments, the internal communication devices 124a-N comprise SIP User Agents (UAs), which allow an internal user to be addressed within the enterprise network 104 via an Address of Record (AoR). In other embodiments, extensions of internal communication devices 124a-N are extensions within the enterprise network 104 that are directly serviced and controlled by the communication server 120. More particularly, these extensions correspond to endpoints serviced by the communication server 120, and the communication server 120 can direct incoming contacts to and receive outgoing contacts from these extensions in a conventional manner. External terminals are not directly supported as endpoints by the communication server 120.

In embodiments where the communications server 120 is a PBX, the internal communication devices 124a-N may have a corresponding extension number assigned thereto. In other embodiments where the communications server 120 is a Unified Communications-based server, such as a server offered within the Avaya Aura™ suite of products, the internal communication devices 124a-N may not have a specific extension number assigned thereto, but instead behave as a UA. In any case, the communications server 120 may comprise the functionality of one or more of a PBX, an enterprise switch, an enterprise server, or other type of telecommunications system switch or server. The communication server 120 is preferably configured to facilitate the execution of telecommunication applications such as the suite of MultiVantage™ or Avaya Aura™ applications of Avaya, Inc., including Communication Manager™, Avaya Aura Communication Manager™, Avaya IP Office™, Communication Manager Branch™, Session Manager™, System Manager™, and MultiVantage Express™

In some embodiments, the communication server 120 may include one or more conferencing applications and associated hardware, such as MultiPoint Conferencing Units™ (MCU), Unified Conferencing™, Web Conferencing™, IP Office Conferencing™, and/or Meeting Exchange™ of Avaya, Inc. These products typically require the participants to dial into a conference bridge using a predetermined dial-in number and access code to initiate conference sessions, without an operator or advanced reservations. As will be appreciated, these products further provide integrated features such as audio and web conference session management, power point push, document annotation and other annotation tools, text chat, desktop and application sharing, polling with instant tabulation, interactive whiteboard session, and conference session recording and playback of audio and web portions of the conference session.

The instant messaging server 132 can support any suitable instant messaging application, such as AOL™, MSN Messenger™, Yahoo! Messenger™, Live Messenger™, and Apple's iChat™.

The media server 136 may be adapted to provide one or more media resources in connection with a communication session. Exemplary media resources include voice, video, text, and multi-media resources. Specifically, the media server 136 may operate in conjunction with an application server 148, which is responsible for controlling various operations of the media server 136 with respect to a communications session.

In particular, an application provided on the application server 148 may be sequenced or otherwise incorporated into a communication session between two or more participants such that the application server 148 is included in the control signaling path of the communications session. The application server 148 may provide a specific application or series of applications for that communications session. Exemplary types of applications include, without limitation, an EC-500 (extension to cellular) application, a call setup application, a voicemail application, an email application, a voice application, a video application, a text application, a conferencing application, a call recording application, a communication log application, a security application, an encryption application, a collaboration application, a whiteboard application, mobility applications, presence applications, media applications, messaging applications, bridging applications, and any other type of application that can supplement or enhance communications.

Additionally, one, two, three, or more applications of a given type can be included in a single application sequence without departing from the scope of the present description. Furthermore, although only one application server 148 is depicted in FIG. 1, two, three or more application servers 148, each having one, two, three, or more applications residing thereon may be provided without departing from the scope of the present description.

In some embodiments, the enterprise network 104 may comprise SIP functionality, in which case the enterprise network 104 includes a SIP server 152. In some embodiments, the SIP server 152 is separate from the communications server 120. In other embodiments, the functionality of the SIP server 152 is incorporated into the communications server 120. Generally speaking, the SIP server 152 is capable of mapping a certain user to a UA as well as enabling other SIP-based features such as intelligent contact resolution features, call routing features, application sequencing features, and the like.

The conferencing server 140 can be any suitable conferencing server, such as a 1056-port CS700 and CS780 Conferencing Server™ of Avaya, Inc. The conferencing server 140 typically includes conferencing bridge functionality. As noted above, in some embodiments, bridging functionality can be provided via an application server 148 instead of a conferencing server 140.

The other servers 156 include a variety of servers, including facsimile servers and messaging servers (such as Avaya Inc.'s Unified Messaging™ server). Other examples of servers 156 include a calendaring server and an email server. A typical email server can support any suitable email application, such as Microsoft Outlook™ or Lotus Notes™. In some embodiments, the email server provides email functionality as well as calendar applications and related functionality.

The first, second, . . . nth communication devices 124a-N can be any suitable communication device or collection of communication devices. For example, the internal communication devices 124a-N may include analog phones, hardphones, softphones, and/or digital telephones. Examples of suitable communication devices include cellular phones, deskphones, computers, laptops, the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The external communication devices 116a-x can be any suitable circuit- or packet-switched or digital (e.g., TDM-enabled) communication device. Examples include wired and wireless telephones, cellular phones, Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts. In some embodiments, the types of communication devices utilized as external communication devices 116a-x may be utilized as internal communication devices 124a-N and vice versa without departing from the scope of the present description.

While the communication system 100 depicts the various servers 132, 136, 140, 148, 152, and 156 as being separate from the communication server 120 and being internal to the enterprise network 104, it is to be understood that the servers may be hosted by the communication server 120 or be located on the communication network 108. For example, a conferencing application can be on the WAN-side of the firewall (not shown) and provide conference session security by means of a conference session URL and security code. In some embodiments, certain applications or the application server itself 148 may be provided in the form of Software as a Service (SaaS) that is accessible via a web interface.

Figure 2:
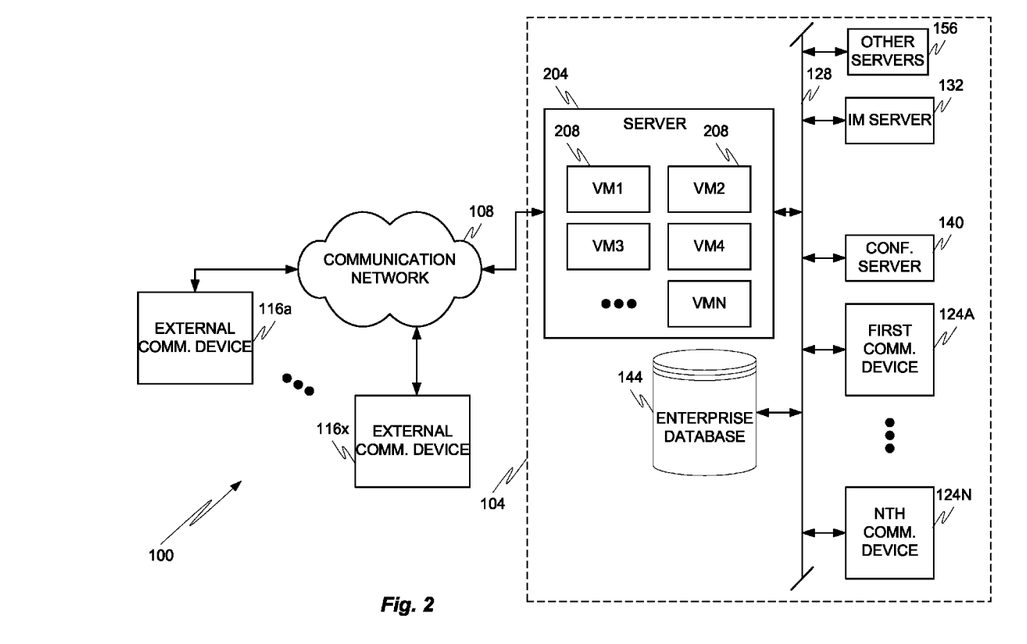
FIG. 2 is a block diagram depicting an exemplary physical machine including a number of virtual machines in accordance with embodiments of the present disclosure.

Referring now to FIG. 2, an exemplary enterprise network comprising one or more virtual machines will be described in accordance with at least some embodiments of the present disclosure. A server 204 may be provided in the enterprise network 104 that includes one or more Virtual Machines (VMs) 208. The server 204 may be referred to as a VM server 204. Each VM 208 residing on the server 204 may operate in place (i.e., in lieu) of one or more physical machines depicted in FIG. 1. In some embodiments, a one-to-one mapping of a physical machine to a VM exists. Stated another way, a system such as the one depicted in FIG. 1 may transition to a system such that the one depicted in FIG. 2 by transitioning a single physical machine into a single VM 208. In some embodiments, the functionality of a single physical machine is separated into a number of VMs 208. In some embodiments, the functionalities of multiple physical machines are incorporated into a single VM 208. Of course, combinations of the above transition from physical machines to VMs can also be achieved.

Although FIG. 2 depicts the enterprise network 104 as still having one or more servers other than server 204, the enterprise network 104 may be embodied completely in VMs, except for the communication devices 124a-N, which will generally still require some sort of dedicated physical machine.

Number of internal communication devices 124a-N is not necessarily the same as the number of VMs 208, even though FIG. 2 depicts up to N VMs 208 and up to N internal communication devices 124.

The enterprise network 104 may include one or more VM servers 204. Advantageously, the utilization of VMs helps reduce the number of physical machines which are required to support functionality of the enterprise network 104. However, in particularly large enterprise networks 104, it may be necessary to provide two or more VM servers 204, each having one, two, three, or more VMs 208. The number of VMs 208 provided on a particular VM server 204 will vary according to the processing requirements of the VM 208 and the capabilities of the VM server 204. Generally speaking, however, it is more than likely that a single VM server 204 will have a plurality of VMs 208 provided thereon. Such a configuration helps to reduce operating costs, maximize processing resource utilization, maximize physical space utilization, and the like.

Figure 3:
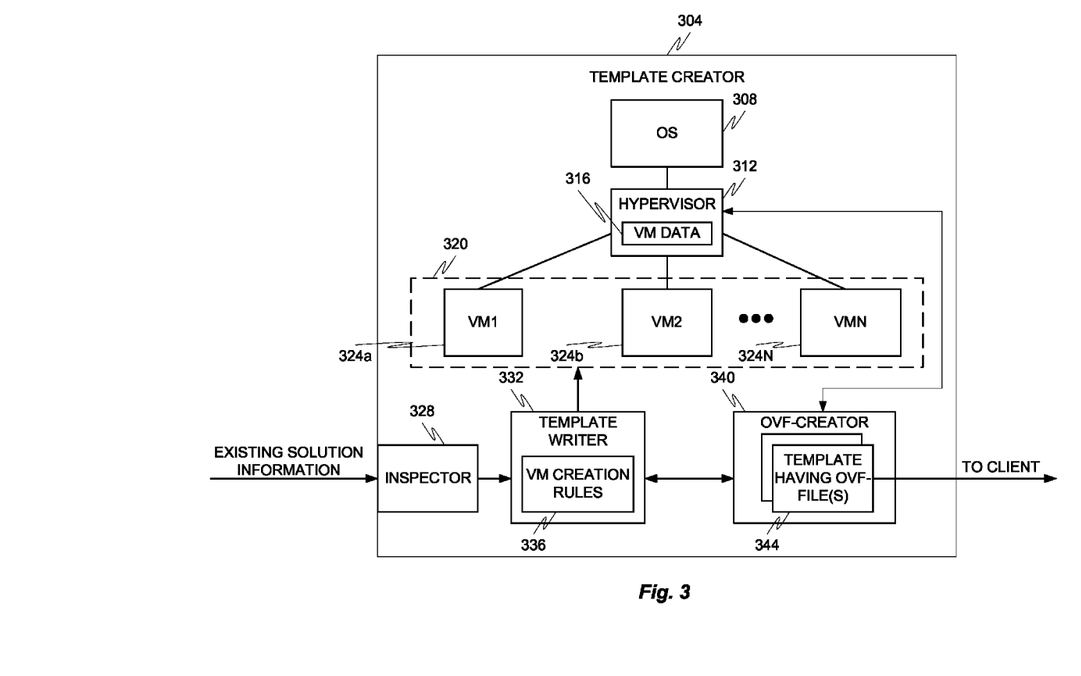
FIG. 3 is a block diagram depicting a virtualization-transition system in accordance with at least some embodiments of the present disclosure.

Referring now to FIG. 3, an exemplary template creator 304 will be described in accordance with at least some embodiments of the present disclosure. The template creator 304 is a tool which can be used to convert one or more physical machines into one or more VMs 208. In some embodiments, the template creator 304 provides an automated mechanism for converting the enterprise network 104 depicted in FIG. 1 to the enterprise network depicted in FIG. 2. In some embodiments, the template creator 304 is owned and operated by the enterprise administering the enterprise network 104. In other embodiments, the template creator 304 is owned and operated by a third-party which assists the enterprise in transitioning its enterprise network 104 from a physical machine-based network to a VM-based network.

In some embodiments, the template creator 304 includes an Operating System (OS) 308, a hypervisor 312, a set of images 320 having images of one or more VMs 324a-N, an inspector 328, a template writer 332 including a set of VM creation rules 336, and an OVR-creator 340 configured to generate templates having OVF file 344.

Figure 5:
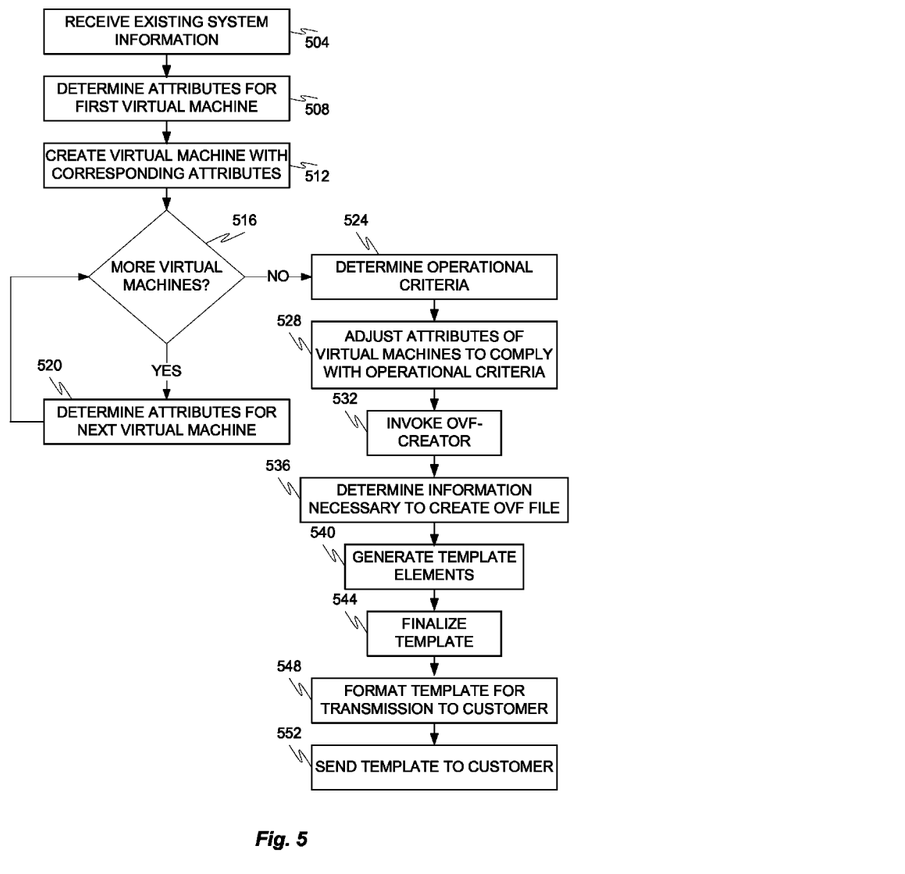
FIG. 5 is a flow diagram depicting a virtualization-transition method in accordance with at least some embodiments of the present disclosure.

In operation, and with reference to FIG. 5, the template creator 304 receives existing solution information at the inspector 328 (step 504). In some embodiments, the existing solution information is received directly from a VM server 204 by examining a VM server 204 and determining the number of VMs, resources used by each VM, and the contents of each VM. In some embodiments, the existing solution information can also be received from a construction or configuration file. The existing solution information may include information which describes one or more components of an enterprise network 104. In some embodiments, the existing solution information includes a description of the number of physical machines included in the enterprise network 104, the processing requirements for each physical machine, the memory requirements for each physical machine, the communication protocols supported by each physical machine, and any other information that is required to duplicate the physical machine. In some embodiments, the existing solution information may also describe the relationship between certain physical machines. For example, if a certain pair of machines utilize a certain communication protocol or have a certain connection, then that information may also be included in the existing solution information. Additionally, an existing solution may already comprise one or more VMs. In some embodiments, information regarding a completely virtual solution is input as existing solution information such that it can be duplicated for other solutions. In some embodiments, information regarding a partially virtual solution is input as existing solution information. This information may be used to generate a completely virtual solution or to make copies of the virtual portions of the solution.

The inspector 328 receives all of the existing solution information and formats it such that it can be recognized by the template writer 332. The template writer 332 receives existing solution information from the inspector 328 and utilizes its VM creation rules 336 to generate a corresponding set of VM images 320 which represent the existing physical solution. In other words, the template writer 332 determines attributes for the various VM images to be created (step 508). In some embodiments, the existing physical solution may already have one or more VMs, in which case the template writer 332 has a relatively easy task of copying information for the existing VM. Otherwise, the template writer 332 is required to convert the information related to a physical machine into a corresponding VM image 324. In some embodiments, multiple images represent a single physical machine. In some embodiments, multiple physical machines are incorporated into a single image. For example, a physical voicemail solution may be embodied in multiple physical machines. Such a physical solution may be combined into a single VM image representing all of the voicemail functions.

For each VM image 324, the template writer 332 is capable of allocating certain resources to the VM image 324 consistent with the processing requirements defined in the existing solution information (step 512). At step 516, the template writer 332 determines if any additional VM images 324 need to be created. If this query is answered affirmatively, then attributes for the next VM images 324 are determined (step 520).

If this query is answered negatively, then the method proceeds with the template writer 332 referring to the VM creation rules 336 to determine if any modifications to the VM images 324a-N are required to ensure that predefined operational criteria are satisfied (step 524). Examples of such predefined operational criteria include business rules describing operational objectives for the enterprise network 104 (e.g., minimize call routing costs, minimize processing costs, maximize call quality, maximize Quality of Service (QoS), minimize risk of system failure or downtime, etc.). Based on these criteria, the template writer 332 may refine one or more of the VM images 324a-N to achieve the criteria (step 528).

Figure 4:
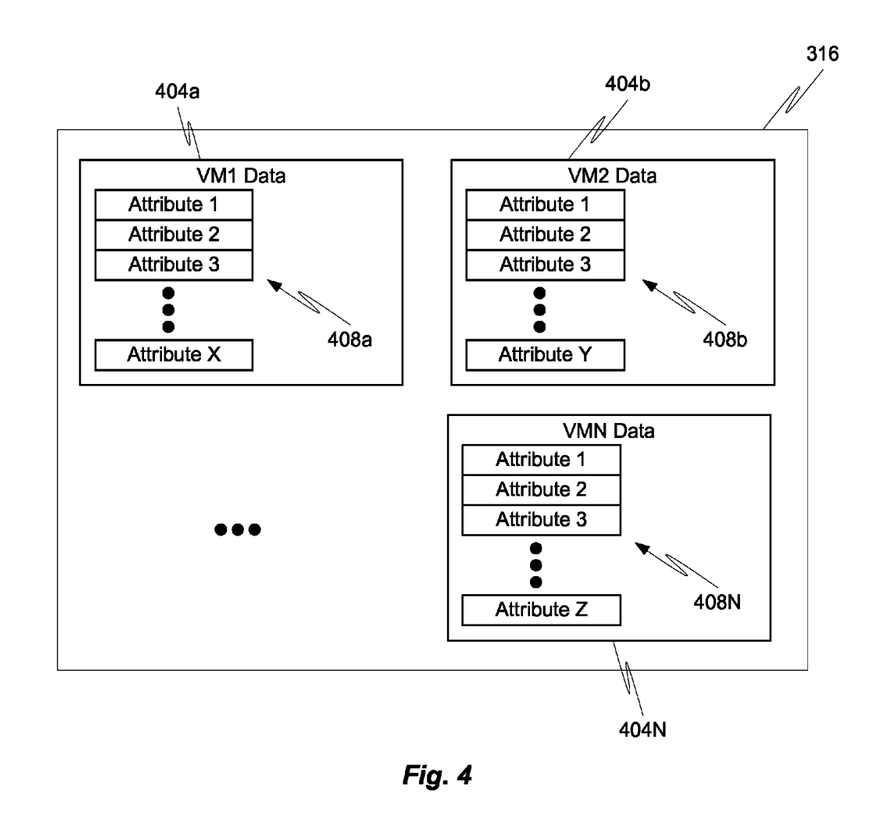
FIG. 4 is a block diagram depicting an exemplary data structure used in accordance with at least some embodiments of the present disclosure.

As can be seen in FIG. 4, VM data 316 is created for the set of images 320. The VM data 316 includes specific VM data segments 404a-N for each of the corresponding VM images 324a-N. The VM data segments 404a-N comprise a list of VM attributes 408a-X, which define the properties of the VM that will be created by the VM image. Examples of the attributes which may be maintained within the list of VM attributes 408a-N include, without limitation, memory, disk, CPU, and/or network resources.

Once the template writer 332 believes that it is done creating the set of images 320, the template writer 332 invokes the OVF-creator 344 to begin generating a template representing the virtual solution contained within the set of images 320 (step 532).

Once invoked, the OVF-creator 344 refers to the VM data 316 through the hypervisor 312 to determine the information needed to prepare the appropriate OVF-file (step 536). In some embodiments the OVF-creator 344 accesses the VM data 316 directly through the hypervisor 312. In some embodiments, the OVF-creator 344 accesses the VM data 316 via the OS 308. By referencing the VM data 316 the OVF-creator 344 is capable of identifying each of the VM images 324a-N in the set of images 320 and the attributes 408a-N thereof.

The OVF-creator 344 takes the VM data 316 and generates an OVF-file compliant with the OVF specification (step 540). The OVF-file is an eXtensible Markup Language (XML) file which describes the data obtained from the VM data 316. The OVF-creator 344 generates other elements of a template including the VM images or instructions for creating the same.

After all of the elements for the template have been generated, the OVF-creator 344 finalizes the template (step 544). The finalized template is then formatted for transmission to a customer (step 548). Formatting the template may include writing the template onto a portable computer-readable medium (e.g., a CD-ROM, DVD-ROM, flash memory, USB stick, or the like) or formatting the template into one or more TCP/IP packets for transmission across a communication network 108. The formatted template is then transmitted to the customer/client (step 552). In some embodiments, the template creator 304 may be created at a service operating one of the external communication devices 116 and the template may be transmitted across the communication network 108 or carried via the portable computer-readable medium to the enterprise network 104 where it can be received and processed such that the enterprise network 104 can be installed by the administrator of the enterprise network 104 to implement the VMs 208 represented in the template.

While the above-described flowchart has been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for creating virtual machines. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:
1. A method, comprising:
receiving, at a template creator, information provided by the template creator and describing an existing solution having one or more physical machines with attributes associated therewith, the attributes of each of the one or more physical machines describing one or more of pro- cessing capabilities, memory capabilities, and communication capabilities of the corresponding one or more physical machines;

scanning the information describing the existing solution with an automated template writer to determine virtual machine attributes representing the physical machine attributes of the corresponding one or more physical machines;

creating, by the template writer, one or more virtual machine images having the virtual machine attributes the virtual images being stored by the template writer on a non-transitory computer readable medium;

determining, by the template writer, that the creation of the one or more virtual machine images is complete; and based on the template writer determining that the creation of the one or more virtual machine images is complete, the template writer invoking an OVF-creator to analyze the one or more virtual machine images and generate an OVF file containing instructions, in machine code, on how to create the virtual machine images, wherein the template creator is an automated mechanism for performing the steps of scanning, creating, determining, and invoking, without a user input, and wherein the automated template writer is a component of the template creator and implemented by the template creator without user involvement.

2. The method of claim 1, further comprising:
referencing, by the template writer, virtual machine creation rules which define rules for creating the one or more virtual machine images to have the virtual machine attributes.

3. The method of claim 2, wherein the virtual machine creation rules define how the one or more virtual machine images are to be initially and independently created and wherein the virtual machine creation rules further define operational criteria that is used to alter the attributes of independently created virtual machine images after such virtual machine images have been created independently.

4. The method of claim 3, wherein the operational criteria include business rules describing operational objectives.

5. The method of claim 1, further comprising:
retrieving, by the OVF-creator, virtual machine data which includes virtual machine attribute information for each of the one or more virtual machine images created by the template writer; and
utilizing, by the OVF-creator, the virtual machine data to generate the OVF file.

6. The method of claim 5, further comprising:
creating, by the OVF-creator, a template that includes the OVF file and one or more virtual machine images corresponding to the one or more virtual machine images created by the template writer.

7. The method of claim 6, further comprising:
formatting the template into a suitable format for sending to a customer; and
sending the formatted template to the customer.

8. The method of claim 7, wherein formatting the template comprises one or more of writing the template onto a portable computer-readable medium and formatting data packets containing at least some of the template for transmission across a communication network.

9. An apparatus for creating a virtual machine, comprising:
an OVF-creator; and
a template writer that receives information provided by the OVF-creator, the information describing an existing solution having one or more physical machines with attributes associated therewith, the attributes of each of the one or more physical machines describing one or more of processing capabilities, memory capabilities, and communication capabilities of the corresponding one or more physical machines, the template writer further scanning the information describing the existing solution to determine virtual machine attributes representing the physical machine attributes of the corresponding one or more physical machines, creating one or more virtual machine images having the virtual machine attributes, storing the virtual images on a non-transitory computer readable medium, determining that the creation of the one or more virtual machine images is complete, and based on making such a determination, invoking the OVF-creator to analyze the one or more virtual machine images and generate an OVF file containing instructions, in machine code, on how to create the virtual machine images, wherein the OVF-creator is an automated mechanism for performing the steps of scanning, creating, determining, and invoking, without a user input, and wherein the template writer is a component of the OVF-creator and implemented by the OVF-creator without user involvement.

10. The apparatus of claim 9, wherein the template writer comprises virtual machine creation rules which define rules for creating the one or more virtual machine images to have the virtual machine attributes.

11. The apparatus of claim 10, wherein the virtual machine creation rules define how the one or more virtual machine images are to be initially and independently created and wherein the virtual machine creation rules further define operational criteria that is used to alter the attributes of independently created virtual machine images after such virtual machine images have been created independently.

12. The apparatus of claim 11, wherein the operational criteria include business rules describing operational objectives.

13. The apparatus of claim 9, wherein the OVF-creator is further configured to retrieve virtual machine data which includes virtual machine attribute information for each of the one or more virtual machine images created by the template writer and utilize the virtual machine data to generate the OVF file.

14. The apparatus of claim 13, wherein the virtual machine data is retrieved via a hypervisor and wherein the OVF-creator is further configured to create a template that includes the OVF file and one or more virtual machine images corresponding to the one or more virtual machine images created by the template writer.

15. The apparatus of claim 14, wherein the OVF-creator is further configured to format the template into a suitable format for sending to a customer and send the formatted template to the customer.

16. The apparatus of claim 15, wherein formatting the template comprises one or more of writing the template onto a portable computer-readable medium and formatting data packets containing at least some of the template for transmission across a communication network.

17. A computer program product comprising computer executable instructions stored onto a non-transitory computer readable medium which, when executed by a processor of a computer, cause the processor to execute a method, the method comprising:
receiving information provided by the processor and describing an existing solution having one or more physical machines with attributes associated therewith, the attributes of each of the one or more physical physical machines describing one or more of processing capabilities, memory capabilities, and communication capabilities of the corresponding one or more physical machines;

scanning the information describing the existing solution to determine virtual machine attributes representing the physical machine attributes of the corresponding one or more physical machines;

creating one or more virtual machine images having the virtual machine attributes; and generating an OVF file containing instructions, in machine code, on how to create the virtual machine images, wherein the processor is executing an automated mechanism for performing the steps of scanning, creating, and generating, without a user input, and wherein the automated mechanism is a component of the computer executable instructions and implemented by the processor without user involvement.

18. The computer program product of claim 17, wherein the method further comprises:

referencing virtual machine creation rules which define rules for creating the one or more virtual machine images to have the virtual machine attributes.

19. The computer program product of claim 18, wherein the virtual machine creation rules define how the one or more virtual machine images are to be initially and independently created, wherein the virtual machine creation rules further define operational criteria that is used to alter the attributes of independently created virtual machine images after such virtual machine images have been created independently, and wherein the operational criteria include business rules describing operational objectives.

* * * * *